United States Patent [19]

Henderson

[11] Patent Number: 5,382,058
[45] Date of Patent: Jan. 17, 1995

[54] ROTATABLE FLANGE UNION FOR USE WITH VACUUM SYSTEMS

[75] Inventor: David E. Henderson, Fremont, Calif.
[73] Assignee: VLSI Technology, Inc., San Jose, Calif.
[21] Appl. No.: 79,440
[22] Filed: Jun. 17, 1993
[51] Int. Cl.$^6$ .................................... F16L 17/10
[52] U.S. Cl. .................................... 285/96; 285/272; 285/281
[58] Field of Search .................. 277/59, 17, 71, 79, 277/3; 285/96, 281, 276, 272

[56] References Cited

U.S. PATENT DOCUMENTS

| | | | |
|---|---|---|---|
| 2,338,716 | 1/1944 | Hardwick | 285/276 |
| 2,384,360 | 9/1945 | Allen et al. | 285/276 X |
| 2,443,993 | 6/1948 | Schenkelberger | 285/276 X |
| 2,512,883 | 6/1950 | Warren | 285/276 X |
| 2,775,470 | 12/1956 | Bixler et al. | 285/96 |
| 3,944,263 | 3/1976 | Arnold | 285/96 |
| 4,084,668 | 4/1978 | Rybicki | 277/59 X |
| 4,113,288 | 9/1978 | Cox | 285/276 X |
| 4,779,638 | 10/1988 | Nitzberg et al. | 285/272 X |
| 4,804,206 | 2/1989 | Wood et al. | 285/276 X |

FOREIGN PATENT DOCUMENTS 4069486 3/1992 Japan .................. 285/272

OTHER PUBLICATIONS

Flexible stainless steel hose available from Nor-Cal Products, Inc., having a business address of 1512 South Oregon Street, P.O. Box 518, Yreka, Calif. 96097.

*Primary Examiner*—Randolph A. Reese
*Assistant Examiner*—Heather Chun Shackelford
*Attorney, Agent, or Firm*—Douglas L. Weller

[57] ABSTRACT

A rotatable flange union for use with vacuum systems includes a first flange, a second flange and a connector which connects the first flange to the second flange and allows the first flange to rotate 360 degrees with respect to the second flange. In the preferred embodiment, tubing of the first flange is placed within tubing of the second flange. Additionally, the connector includes a first quad ring seal, a second quad ring seal, and a cavity in the second flange. The first quad ring seal is in contact with an inner diameter of the second flange and is in contact with an outer diameter of the first flange. The second quad ring seal is in contact with the inner diameter of the second flange and is in contact with the outer diameter of the first flange. The cavity is between the first quad ring seal and the second quad ring seal. The cavity is pumped to a pressure of less than ten millitorr.

4 Claims, 1 Drawing Sheet

ROTATABLE FLANGE UNION FOR USE WITH VACUUM SYSTEMS

BACKGROUND

This invention relates to a rotatable flange union for use with vacuum systems.

In processing equipment which require a high vacuum, it is often necessary to use tube connections as part of the vacuum system. When it is necessary to have movement in the tube connectors, flexible tubing has been used. For example, flexible stainless steel hose is available from Nor-Cal Products, Inc., having a business address of 1512 South Oregon Street, P.O. Box 518, Yreka, Calif. 96097.

However, flexible tubing has a limited range of motion. In addition, the use of flexible tubing limits the conductance of the vacuum through the tubing and can decrease system reliability.

SUMMARY OF THE INVENTION

In accordance with the preferred embodiment of the present invention, there is presented a rotatable flange union for use with vacuum systems. The rotatable flange union includes a first flange, a second flange and a connector which connects the first flange to the second flange and allows the first flange to rotate 360 degrees with respect to the second flange.

In the preferred embodiment, tubing of the first flange is placed within tubing of the second flange. Additionally, the connector includes a first quad ring seal, a second quad ring seal, and a cavity in the second flange. The first quad ring seal is in contact with an inner diameter of the second flange and is in contact with an outer diameter of the first flange. The second quad ring seal is in contact with the inner diameter of the second flange and is in contact with the outer diameter of the first flange. The cavity is between the first quad ring seal and the second quad ting seal. For example, the cavity is pumped to a pressure of less than ten millitorr.

Also in the preferred embodiment of the present invention, the rotatable flange union includes a first brass bushing and a second brass bushing. The first brass bushing is in contact with the inner diameter of the second flange and is in contact with the outer diameter of the first flange. The second brass bushing is in contact with the inner diameter of the second flange and is in contact with the outer diameter of the first flange.

The present invention provides a rotatable flange union that allows flanges to be rotated 360 degrees with a minimal loss of conductance. This facilitates the maintenance of a high vacuum integrity while simultaneously providing a freely rotating flange union.

DESCRIPTION OF THE PREFERRED EMBODIMENT

Figure 1:
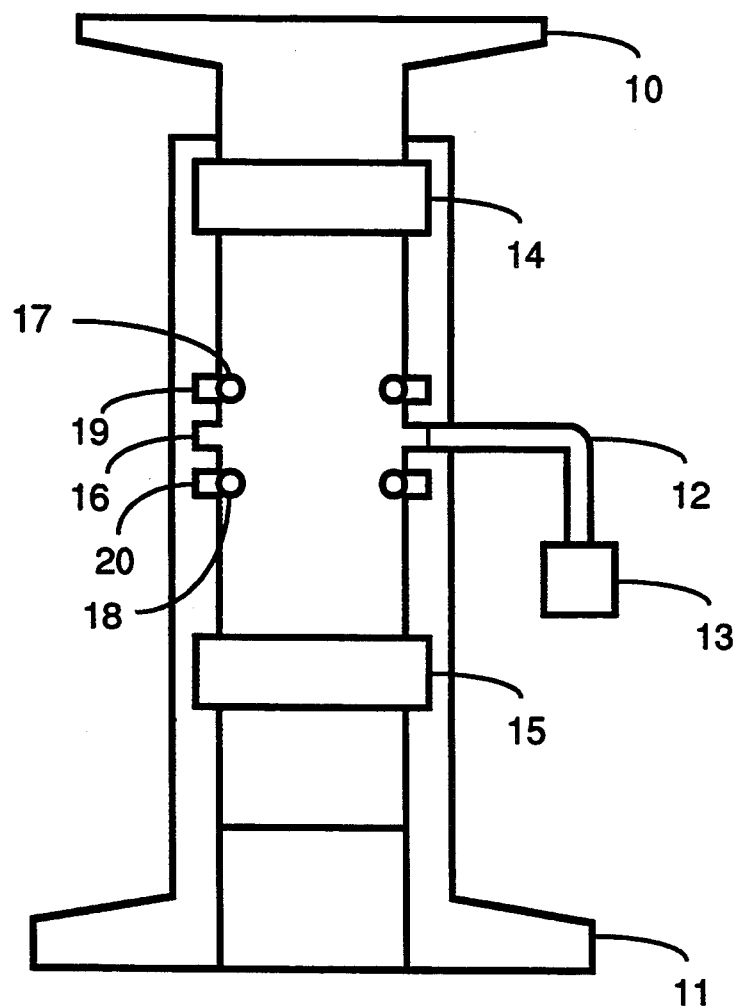
FIG. 1 shows a rotatable flange union for use with vacuum systems in accordance with the preferred embodiment of the present invention.

FIG. 1 shows a rotatable flange union for use with vacuum systems in accordance with the preferred embodiment of the present invention. A flange 10 is, for example a KF-40 flange available from Nor-Cal Products, Inc. Flange 10 has an outer diameter of, for example, 2.17 inches. A flange 11 is, for example, a KF-50 flange, also available from Nor-Cal Products, Inc. Flange 11 has an outer diameter of 2.95 inches and an inner diameter of 1.5 inches. While in the preferred embodiment, KF-40 and KF-50 flanges are used, any compatible KF or conflat flanges could be used.

A brass bushing 14 has an outer diameter of 1.875 inches and an inner diameter of 1.510 inches. Brass bushing 14 is, for example, 1.00 inch wide. Likewise, a brass bushing 15 has an outer diameter of 1.875 inches and an inner diameter of 1.510 inches. Brass bushing 15 is, for example, 1.00 inch wide. Brass bushing 14 and brass bushing 15 are separated a distance of three inches.

A quad ring groove 19 is one inch from brass bushing 14. Quad ring groove 19 has an outer diameter of 1.750 inches. Likewise, a quad ring groove 20 is one inch from brass bushing 15. Quad ring groove 20 has an outer diameter of 1.750 inches. The centerline of quad ring groove 19 is 1.0 inches from the centerline of quad ring groove 20. A quad ring seal 17 placed within quad ring groove 19 is, for example, a pn 27-459657 quad ring seal available from Varian Associates, having a business address of 611 Hansen Way, Palo Alto, Calif. 94303. Likewise, a quad ring seal 18 placed within quad ring groove 20 is, for example, a pn 27-459657 quad ring seal 18 available from Varian Associates. Quad ring seals 17 and 18 each extend into inner flange 10 half the width of the quad ring seal, that is, approximately 0.062 inches.

Between quad ring seal 17 and quad ring seal 18, a cavity 16 extends around the inner diameter of flange 11 and is 0.63 inches deep. A differential pump line 12 is attached to cavity 16. A ¼ inch vacuum compressor ring (VCR) gland attached to differential pipe line 12 allows attachment to a vacuum pump 13. Vacuum pump 13 pumps the cavity 16 to a pressure of less than 10 millitorr.

When connected, the resulting rotatable flange is five inches from flange tip to flange tip. The flanges may be rotated 360 degrees with a minimal loss of conductance facilitating the maintenance of a high vacuum integrity while allowing free rotation.

The foregoing discussion discloses and describes merely exemplary methods and embodiments of the present invention. Therefore, as will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A rotatable flange union for use with vacuum systems comprising:
   a first flange;
   a second flange, tubing of the first flange being placed within tubing the second flange; and,
   connection means coupling the first flange to the second flange and allowing the first flange to rotate 360 degrees with respect to the second flange, the connection means including
   a first quad ring seal in contact with an inner diameter of the second flange and in contact with an outer diameter of the first flange,
   a second quad ring seal in contact with the inner diameter of the second flange and in contact with the outer diameter of the first flange, and a cavity in the second flange, the cavity between the first quad ring seal and the second quad ring seal, wherein the cavity is pumped to a pressure of less than ten millitorr.

2. A rotatable flange union as in claim 1 additionally comprising:

a first brass bushing in contact with the inner diameter of the second flange and in contact with the outer diameter of the first flange; and, a second brass bushing in contact with the inner diameter of the second flange and in contact with the outer diameter of the first flange.

3. A method for providing rotatable flange union for use with vacuum systems comprising the step of:

(a) connecting a first flange to a second flange with a connector which allows the first flange to rotate 360 degrees with respect to the second flange, including the following substeps:

(a.1) placing tubing of the first flange within tubing of the second flange;

(a.2) placing a first quad ring seal in contact with an inner diameter of the second flange and in contact with an outer diameter of the first flange;

(a.3) placing a second quad ring seal in contact with the inner diameter of the second flange and in contact with the outer diameter of the first flange;

(a.4) placing a cavity in the second flange between the first quad ring seal and the second quad ring seal; and, (a.5) pumping the cavity to a pressure of less than ten millitorr.

4. A method as in claim 3 wherein step (a) additionally comprises the following substeps:

(a.6) placing a first brass bushing in contact with an inner diameter of the second flange and in contact with the outer diameter of the first flange: and, (a.7) placing a second brass bushing in contact with an inner diameter of the second flange and in contact with the outer diameter of the first flange.

* * * * *